(12) United States Patent
Lemahieu et al.

(10) Patent No.: US 11,545,841 B2
(45) Date of Patent: Jan. 3, 2023

(54) METHODS AND APPARATUS FOR AUTONOMOUS BALANCING AND COMMUNICATION IN A BATTERY SYSTEM

(71) Applicant: SEMICONDUCTOR COMPONENTS INDUSTRIES, LLC, Phoenix, AZ (US)

(72) Inventors: Joris Lemahieu, Dentergem (BE); Andre Saillart, Paris (FR); Peter H. J. M. Cox, Drongen (BE); Pierre Lebas, Bondues (FR)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 294 days.

(21) Appl. No.: 16/686,894

(22) Filed: Nov. 18, 2019

(65) Prior Publication Data
US 2021/0151996 A1 May 20, 2021

(51) Int. Cl.
*H02J 7/00* (2006.01)
*H01M 10/42* (2006.01)
(Continued)

(52) U.S. Cl.
CPC ....... *H02J 7/0018* (2013.01); *H01M 10/4207* (2013.01); *H01M 10/4264* (2013.01); *H01M 10/482* (2013.01); *H02J 7/0014* (2013.01); *H02J 7/0019* (2013.01); *H02J 7/0021* (2013.01); *H02J 7/0047* (2013.01); *H02J 7/342* (2020.01); *H01M 10/4257* (2013.01); *H01M 10/486* (2013.01); *H01M 2010/4271* (2013.01); *H02J 7/0013* (2013.01);
(Continued)

(58) Field of Classification Search
CPC ...... H02J 7/0018; H02J 7/0014; H02J 7/0019; H02J 7/0021; H02J 7/0047; H02J 7/342; H01M 10/4207; H01M 10/4264; H01M 10/482; H01M 10/4257
USPC ......................................................... 320/118
See application file for complete search history.

(56) References Cited

U.S. PATENT DOCUMENTS 5,504,415 A * 4/1996 Podrazhansky ....... H02J 7/0016
320/118
5,710,504 A * 1/1998 Pascual ................. H02J 7/0018
180/65.8
(Continued)

FOREIGN PATENT DOCUMENTS

CN 102064356 A * 5/2011
CN 105765873 A * 7/2016 ....... H04L 12/40045
(Continued)

OTHER PUBLICATIONS

"Capacitors," JimBlom, Sparkfun, with published comments from 7 years ago [2015 or 2014], accessed online Nov. 2, 2021, https://learn.sparkfun.com/tutorials/capacitors/application-examples and https://learn.sparkfun.com/tutorials/capacitors/discuss (Year: 2015).*

*Primary Examiner* — John T Trischler
(74) *Attorney, Agent, or Firm* — Dickinson Wright PLLC

(57) ABSTRACT

An apparatus for communication and balancing in a battery system includes a battery pack connected to a management network. The management network is configured to communicate with a master controller via a communication bus. The apparatus is configured to operate in a communication mode and a balancing mode.

18 Claims, 8 Drawing Sheets

(51) Int. Cl.
*H01M 10/48* (2006.01)
*H02J 7/34* (2006.01)

(52) U.S. Cl.
CPC ..... *H02J 7/00714* (2020.01); *H02J 7/007182* (2020.01); *H02J 7/007194* (2020.01)

(56) References Cited

U.S. PATENT DOCUMENTS

| | | | | |
|---|---|---|---|---|
| 5,814,970 A * | 9/1998 | Schmidt | H01M 10/441 | 320/118 |
| 6,081,095 A * | 6/2000 | Tamura | B60L 58/15 | 320/118 |
| 6,121,751 A * | 9/2000 | Merritt | H02J 7/0018 | 320/116 |
| 6,140,800 A * | 10/2000 | Peterson | H02J 7/0018 | 320/118 |
| 6,624,612 B1 * | 9/2003 | Lundquist | H01M 10/4207 | 320/118 |
| 6,693,851 B1 * | 2/2004 | Fujisawa | G04G 19/12 | 368/203 |
| 6,700,349 B2 * | 3/2004 | Emori | B60L 58/22 | 320/104 |
| 6,828,798 B2 * | 12/2004 | Morimoto | B60K 6/28 | 903/907 |
| 6,873,134 B2 * | 3/2005 | Canter | H02J 7/0021 | 320/118 |
| 7,443,138 B2 * | 10/2008 | Ishikawa | H02J 7/0018 | 320/118 |
| 7,511,457 B2 * | 3/2009 | Emori | B60L 58/22 | 320/118 |
| 7,745,025 B2 * | 6/2010 | Leach | H02J 7/0026 | 429/9 |
| 7,888,910 B2 * | 2/2011 | Zeng | H02J 7/0019 | 320/118 |
| 7,893,521 B2 * | 2/2011 | Lunenburg | H05C 1/04 | 257/532 |
| 7,911,178 B2 * | 3/2011 | Kawata | H01M 10/425 | 320/116 |
| 8,054,044 B2 * | 11/2011 | Kang | H02J 7/0016 | 320/118 |
| 8,159,184 B2 * | 4/2012 | Emori | H02J 7/005 | 320/116 |
| 8,193,763 B2 * | 6/2012 | Kawata | H01M 10/425 | 320/107 |
| 8,212,571 B2 * | 7/2012 | Emori | B60L 58/19 | 324/522 |
| 8,466,657 B2 * | 6/2013 | Buono | H02J 7/0019 | 320/121 |
| 8,583,389 B2 * | 11/2013 | Aoshima | B60L 58/16 | 702/63 |
| 8,643,500 B2 * | 2/2014 | Lee | B60L 58/22 | 340/636.1 |
| 8,692,508 B2 * | 4/2014 | Shimizu | H02J 7/0016 | 320/103 |
| 8,710,801 B2 * | 4/2014 | Schwartz | H02J 7/0016 | 320/119 |
| 8,742,619 B2 * | 6/2014 | Ohkura | H02J 7/0016 | 307/43 |
| 8,773,070 B2 * | 7/2014 | Kang | H02J 7/0016 | 320/118 |
| 8,798,832 B2 * | 8/2014 | Kawahara | B60L 58/13 | 701/22 |
| 8,878,492 B2 * | 11/2014 | Furukawa | H01M 10/425 | 320/116 |
| 8,902,072 B2 * | 12/2014 | Lee | G01R 31/28 | 340/636.1 |
| 8,981,722 B2 * | 3/2015 | Miura | B60L 58/20 | 320/118 |
| 9,000,726 B2 * | 4/2015 | Sakurai | H02J 7/0016 | 320/118 |
| 9,000,935 B2 * | 4/2015 | Dao | H04Q 9/00 | 340/636.1 |
| 9,048,670 B2 * | 6/2015 | Kim | H02J 7/0019 | |
| 9,130,379 B2 * | 9/2015 | Sakabe | B60L 58/22 | |
| 9,142,980 B2 * | 9/2015 | Lee | H02J 7/0016 | |
| 9,203,246 B2 * | 12/2015 | Kang | H02J 7/0014 | |
| 9,214,822 B2 * | 12/2015 | Hartley | B60L 58/22 | |
| 9,230,748 B1 * | 1/2016 | Semrau | H02J 7/345 | |
| 9,270,127 B2 * | 2/2016 | Coenen | H02J 7/0026 | |
| 9,302,595 B2 * | 4/2016 | Tabatowski-Bush | B60L 58/10 | |
| 9,389,251 B2 * | 7/2016 | Chen | G01R 19/25 | |
| 9,472,961 B2 * | 10/2016 | De Cock | H02J 7/0019 | |
| 9,531,210 B2 * | 12/2016 | DeCock | H02J 7/007182 | |
| 9,577,442 B2 * | 2/2017 | Sakurai | H02J 7/0016 | |
| 9,620,967 B2 * | 4/2017 | Butzmann | H02J 7/0048 | |
| 9,647,467 B2 * | 5/2017 | Verhaeven | H02J 7/0016 | |
| 9,673,641 B2 * | 6/2017 | Miyajima | H02J 7/0047 | |
| 9,731,616 B2 * | 8/2017 | Hatanaka | B60L 58/14 | |
| 9,793,725 B2 * | 10/2017 | Sung | H01M 10/441 | |
| 9,847,654 B2 * | 12/2017 | Beaston | H02J 7/342 | |
| 9,882,401 B2 * | 1/2018 | Beaston | H02J 7/0047 | |
| 9,948,117 B2 * | 4/2018 | Lu | H02J 7/0016 | |
| 10,038,329 B2 * | 7/2018 | De Cock | H02J 7/0047 | |
| 10,177,580 B2 * | 1/2019 | Wu | H02J 7/0016 | |
| 10,305,293 B2 * | 5/2019 | Hofer | G01R 31/389 | |
| 10,356,537 B2 * | 7/2019 | Niklaus | H04B 5/0037 | |
| 10,446,880 B2 * | 10/2019 | Sung | H01M 10/42 | |
| 10,476,113 B2 * | 11/2019 | Toya | H01M 10/4257 | |
| 10,511,178 B2 * | 12/2019 | Zimmanck | H02J 7/35 | |
| 10,554,056 B2 * | 2/2020 | Jeon | H02J 7/00302 | |
| 10,566,804 B2 * | 2/2020 | De Cock | H02J 7/0019 | |
| 10,620,647 B1 * | 4/2020 | Yen | G05F 1/46 | |
| 10,700,536 B2 * | 6/2020 | Kubota | H02J 7/0048 | |
| 10,971,763 B2 * | 4/2021 | Sung | B60L 50/50 | |
| 11,027,614 B2 * | 6/2021 | Nakao | G01R 31/382 | |
| 11,031,794 B2 * | 6/2021 | Zimmanck | H02J 13/00007 | |
| 11,088,550 B2 * | 8/2021 | Jaensch | H02J 7/02 | |
| 11,146,076 B2 * | 10/2021 | Thomson | B60L 50/66 | |
| 2005/0017682 A1 * | 1/2005 | Canter | H02J 7/0021 | 320/118 |
| 2005/0242667 A1 * | 11/2005 | Emori | B60L 58/24 | 307/10.1 |
| 2006/0214636 A1 * | 9/2006 | Arai | H01M 10/482 | 320/116 |
| 2008/0219337 A1 * | 9/2008 | Kawata | H01M 10/425 | 375/225 |
| 2009/0085516 A1 * | 4/2009 | Emori | B60L 3/0046 | 320/118 |
| 2009/0087722 A1 * | 4/2009 | Sakabe | H02J 7/0047 | 429/61 |
| 2009/0091332 A1 * | 4/2009 | Emori | B60L 50/64 | 324/537 |
| 2009/0140694 A1 * | 6/2009 | Zeng | H02J 7/0016 | 320/118 |
| 2009/0190273 A1 * | 7/2009 | Moran | H01G 9/26 | 903/907 |
| 2009/0224769 A1 * | 9/2009 | Emori | H02J 7/0021 | 324/426 |
| 2009/0315515 A1 * | 12/2009 | Yu | H02J 7/0016 | 320/116 |
| 2010/0109608 A1 * | 5/2010 | Buono | H02J 7/0019 | 320/121 |
| 2010/0123433 A1 * | 5/2010 | Guo | H01M 10/482 | 320/118 |
| 2010/0185405 A1 * | 7/2010 | Aoshima | B60L 58/22 | 702/63 |
| 2010/0207578 A1 * | 8/2010 | Lee | H02J 7/0016 | 320/118 |
| 2010/0237830 A1 * | 9/2010 | Castelaz | H02J 7/0019 | 320/118 |
| 2011/0140665 A1 * | 6/2011 | Tamezane | H02J 7/0016 | 320/118 |
| 2011/0187326 A1 * | 8/2011 | Kawata | H01M 10/425 | 320/116 |
| 2011/0210747 A1 * | 9/2011 | Heo | H02J 7/0021 | 324/434 |
| 2011/0313613 A1 * | 12/2011 | Kawahara | H02J 7/0016 | 701/34.4 |

(56) References Cited

U.S. PATENT DOCUMENTS

| | | | |
|---|---|---|---|
| 2012/0112685 A1* | 5/2012 | Hartley | B60L 58/22 320/106 |
| 2012/0139493 A1* | 6/2012 | Sakurai | H02J 7/0016 320/118 |
| 2012/0161708 A1* | 6/2012 | Miura | B60L 58/14 320/118 |
| 2012/0280573 A1* | 11/2012 | Ohkura | H02J 7/0016 307/80 |
| 2013/0015805 A1* | 1/2013 | Teggatz | H02J 7/0047 320/101 |
| 2013/0015820 A1* | 1/2013 | Kim | H02J 7/0019 320/128 |
| 2013/0015821 A1* | 1/2013 | Kim | H02J 7/0019 320/128 |
| 2013/0020982 A1* | 1/2013 | Mercier | B60L 58/15 320/103 |
| 2013/0049691 A1* | 2/2013 | Sakurai | H02J 7/0019 320/118 |
| 2013/0113428 A1* | 5/2013 | Emori | B60L 50/16 320/118 |
| 2013/0119936 A1* | 5/2013 | Emori | B60L 53/51 320/118 |
| 2013/0127419 A1* | 5/2013 | Peter | H02J 7/0014 320/119 |
| 2013/0207609 A1* | 8/2013 | Emori | B60L 58/19 320/116 |
| 2013/0214740 A1* | 8/2013 | Emori | B60L 58/15 320/118 |
| 2014/0002005 A1* | 1/2014 | Sutardja | H02J 7/0016 320/103 |
| 2014/0070757 A1* | 3/2014 | Hong | H02J 7/0019 320/103 |
| 2014/0139184 A1* | 5/2014 | De Vries | H02J 7/0019 320/116 |
| 2014/0176148 A1* | 6/2014 | Makihara | B60L 58/18 324/434 |
| 2014/0197682 A1* | 7/2014 | Tabatowski-Bush | B60L 58/22 307/9.1 |
| 2014/0266062 A1* | 9/2014 | Lee | H01M 10/48 320/134 |
| 2014/0340022 A1* | 11/2014 | Kang | H02J 7/0014 320/103 |
| 2014/0340042 A9* | 11/2014 | Emori | B60L 3/0046 320/116 |
| 2014/0368040 A1* | 12/2014 | Chen | H04Q 9/00 307/52 |
| 2015/0145443 A1* | 5/2015 | Butzmann | H02J 7/0048 318/139 |
| 2015/0207342 A1* | 7/2015 | Miyajima | H02J 7/0021 320/116 |
| 2015/0207345 A1* | 7/2015 | Greening | H02J 7/0016 320/118 |
| 2015/0340886 A1* | 11/2015 | Sung | H02J 7/0022 320/118 |
| 2015/0340888 A1* | 11/2015 | Hofer | G01N 7/00 374/143 |
| 2016/0118817 A1* | 4/2016 | Uno | H02J 7/345 320/166 |
| 2016/0141894 A1* | 5/2016 | Beaston | H02J 7/342 320/103 |
| 2016/0190828 A1* | 6/2016 | Nakamura | H02J 7/0019 320/118 |
| 2016/0190830 A1* | 6/2016 | Kuhlmann | H02J 7/0016 320/116 |
| 2016/0269195 A1* | 9/2016 | Coenen | H02J 7/00036 |
| 2017/0005487 A1* | 1/2017 | De Cock | H02J 7/0019 |
| 2017/0018819 A1* | 1/2017 | Toya | H01M 10/615 |
| 2017/0093193 A1* | 3/2017 | De Cock | H02J 7/0047 |
| 2017/0163049 A1* | 6/2017 | Zimmanck | H02J 3/32 |
| 2017/0201103 A1* | 7/2017 | Jeon | H02J 7/005 |
| 2018/0019606 A1* | 1/2018 | Kang | H02J 7/342 |
| 2018/0040922 A1* | 2/2018 | Sung | H01M 10/42 |
| 2018/0226809 A1* | 8/2018 | Yang | H02J 7/0014 |
| 2019/0097441 A1* | 3/2019 | Chen | H01M 10/441 |
| 2019/0115769 A1* | 4/2019 | Chen | H02J 7/0029 |
| 2019/0174239 A1* | 6/2019 | Niklaus | H04B 5/0037 |
| 2019/0237816 A1* | 8/2019 | Kim | H02J 7/0021 |
| 2019/0252735 A1* | 8/2019 | Sung | H01M 10/42 |
| 2019/0310321 A1* | 10/2019 | Mi | B60L 58/22 |
| 2020/0036055 A1* | 1/2020 | Toya | H01M 10/48 |
| 2020/0106277 A1* | 4/2020 | Zimmanck | H02J 7/0019 |
| 2020/0185790 A1* | 6/2020 | Toya | H01M 10/4257 |
| 2020/0251927 A1* | 8/2020 | Coats | G01R 15/14 |
| 2021/0056060 A1* | 2/2021 | An | G06F 13/4022 |
| 2021/0099092 A1* | 4/2021 | Basso | H02M 3/33523 |
| 2021/0184270 A1* | 6/2021 | Sung | B60L 50/50 |
| 2021/0255252 A1* | 8/2021 | Kondo | G01R 31/367 |
| 2021/0296903 A1* | 9/2021 | Zimmanck | H02J 13/00007 |

FOREIGN PATENT DOCUMENTS

| | | | |
|---|---|---|---|
| CN | 106427615 A | * 2/2017 | ............ B60L 11/005 |
| JP | 2013013291 A | 1/2013 | |

* cited by examiner

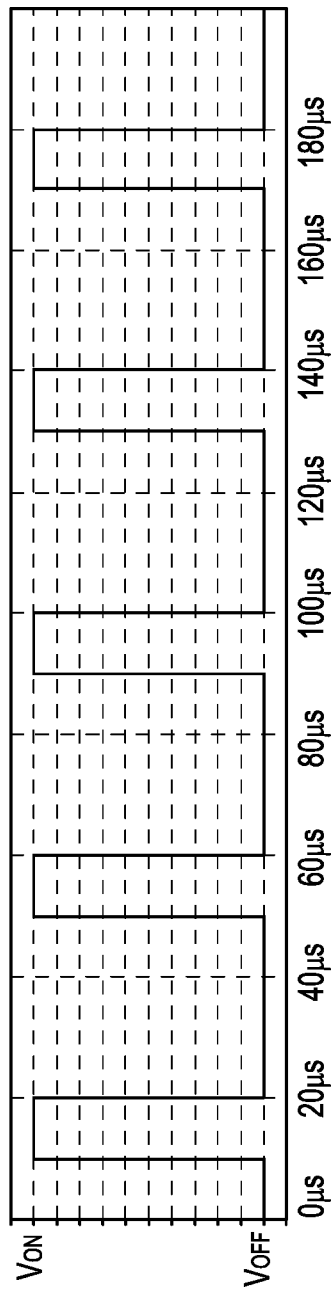
FIG.3A $V_T$
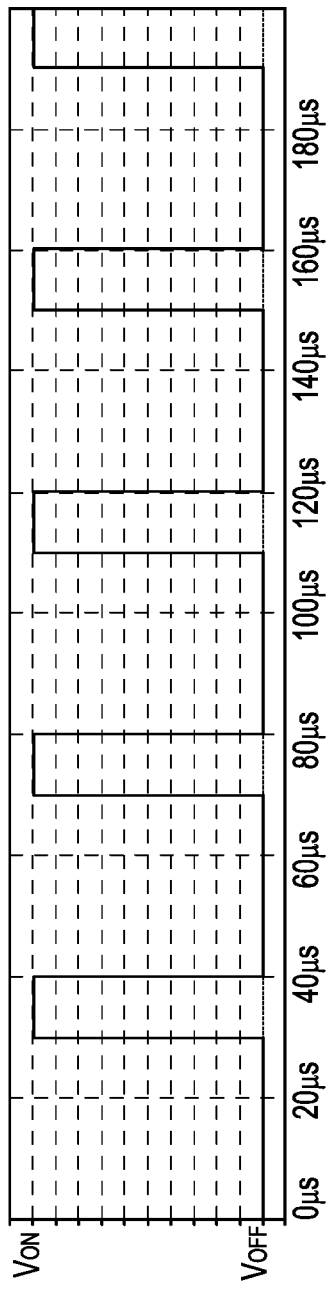
FIG.3B $V_B$
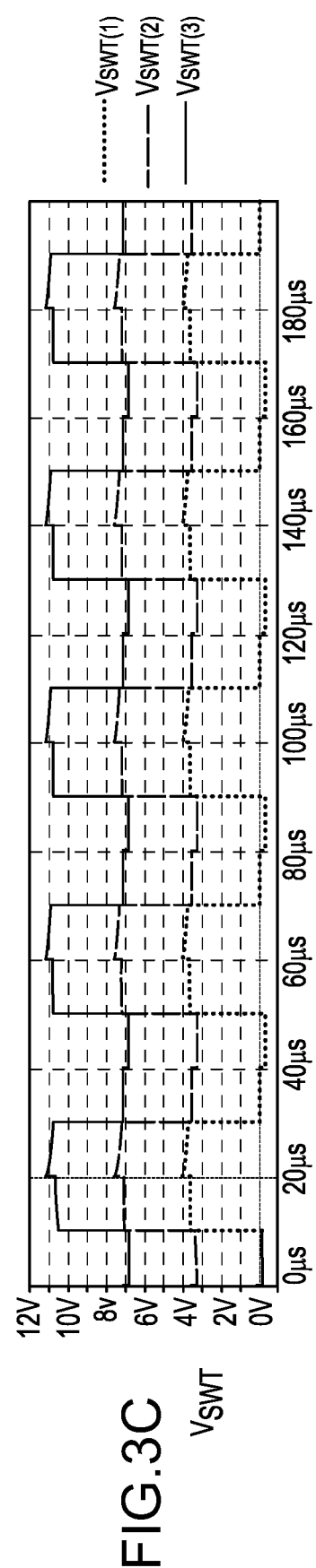
FIG.3C $V_{SWT}$

METHODS AND APPARATUS FOR AUTONOMOUS BALANCING AND COMMUNICATION IN A BATTERY SYSTEM

BACKGROUND OF THE TECHNOLOGY

An increasing number of battery-powered systems that are equipped with a battery pack (i.e., series-connected batteries) utilize active balancing techniques to improve storage capacity and life cycle of the battery pack. Switched-capacitor balancing techniques are commonly used for this purpose. In addition, it is generally desirable to monitor each battery in the battery pack to prevent unsafe conditions, such as over-voltage, under-voltage, excessive temperature, etc., by enabling a safety mechanism in the event that such a condition is detected. Conventional monitoring of each battery cell in battery pack requires extra wiring in addition to the basic pack wiring.

SUMMARY OF THE INVENTION

Various embodiments of the present technology may provide methods and apparatus for autonomous balancing and communication in a battery system. The apparatus may include a battery pack connected to a management network. The management network may be configured to communicate with a master controller via a communication bus. The apparatus may be configured to operate in a balancing mode, a communication mode, or in a simultaneous balancing and communication mode.

BRIEF DESCRIPTION OF THE DRAWING FIGURES

A more complete understanding of the present technology may be derived by referring to the detailed description when considered in connection with the following illustrative figures. In the following figures, like reference numbers refer to similar elements and steps throughout the figures.

FIG. 3A is a timing diagram of a first balancing signal the during an autonomous balancing mode in accordance with an exemplary embodiment of the present technology;

FIG. 3B is a timing diagram of a second balancing signal during the autonomous balancing mode in accordance with an exemplary embodiment of the present technology;

FIG. 3C illustrates voltage waveforms for multiple management cells during the autonomous balancing mode in accordance with an exemplary embodiment of the present technology;

Figure 5A:
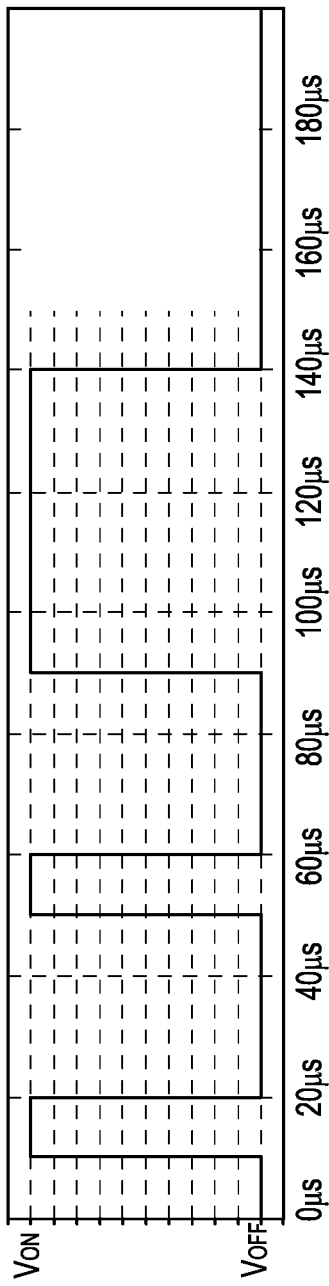
FIG. 5A is a timing diagram of the first balancing signal in the event of an error during the autonomous balancing mode in accordance with an exemplary embodiment of the present technology.
Figure 5B:
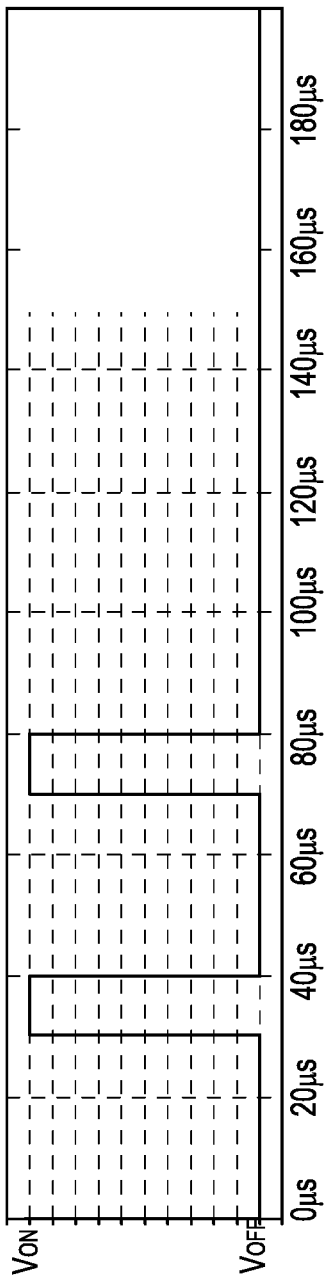
FIG. 5B is a timing diagram of the second balancing signal in the event of an error during the autonomous balancing mode in accordance with an exemplary embodiment of the present technology.
Figure 5C:
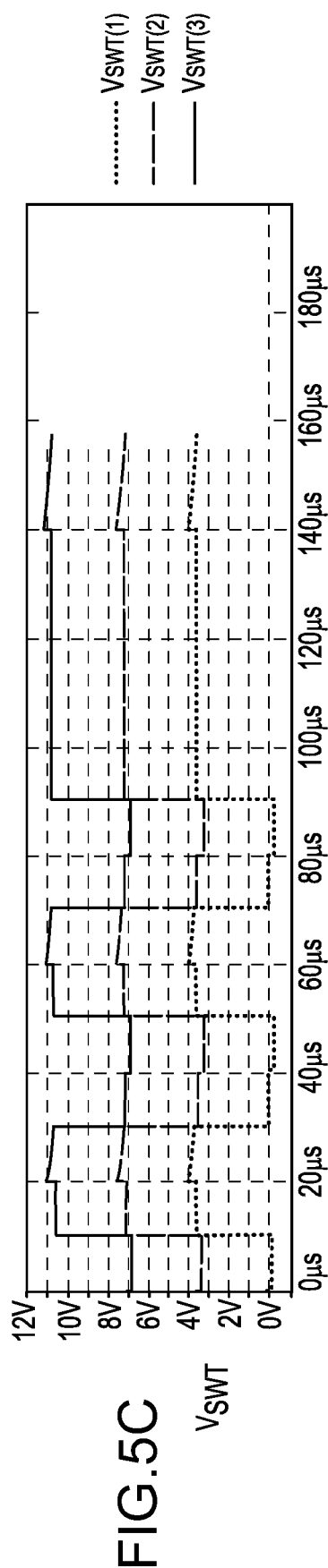
Figure 6A:
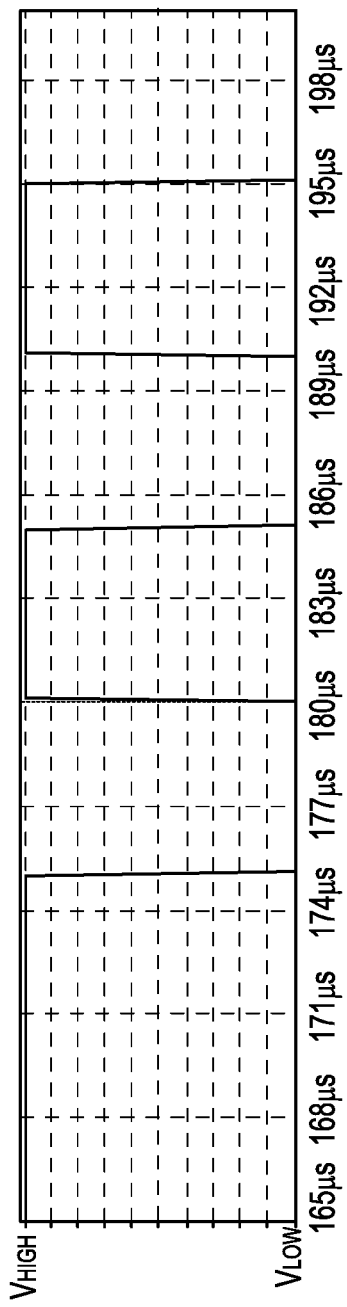
Figure 6B:
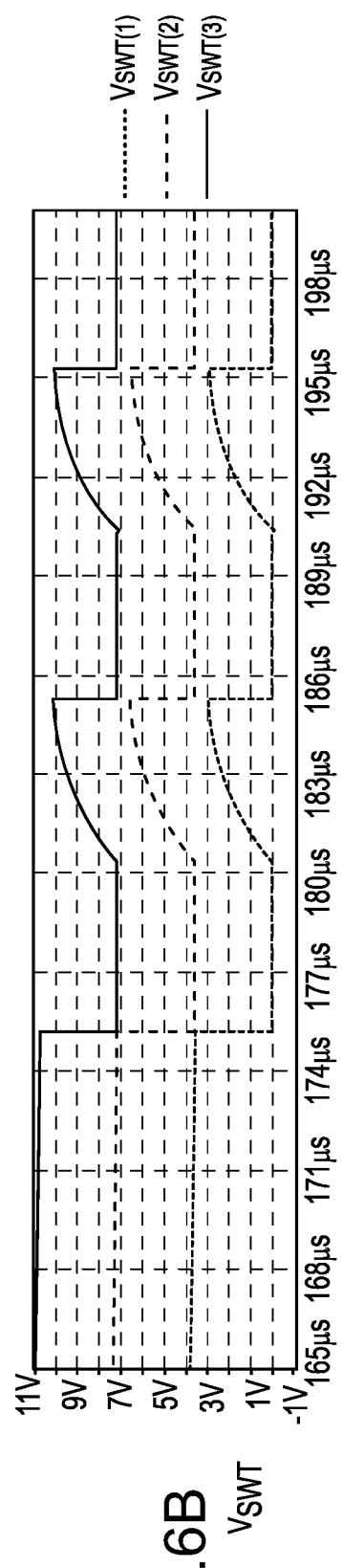

FIG. 5C illustrates voltage waveforms for multiple management cells in the event of an error during the autonomous balancing mode in accordance with an exemplary embodiment of the present technology; and FIG. 6A is a timing diagram of a communication signal during a communication mode in accordance with an exemplary embodiment of the present technology; and FIG. 6B illustrates voltage waveforms for multiple management cells during the communication mode in accordance with an exemplary embodiment of the present technology.

Figure 7A:
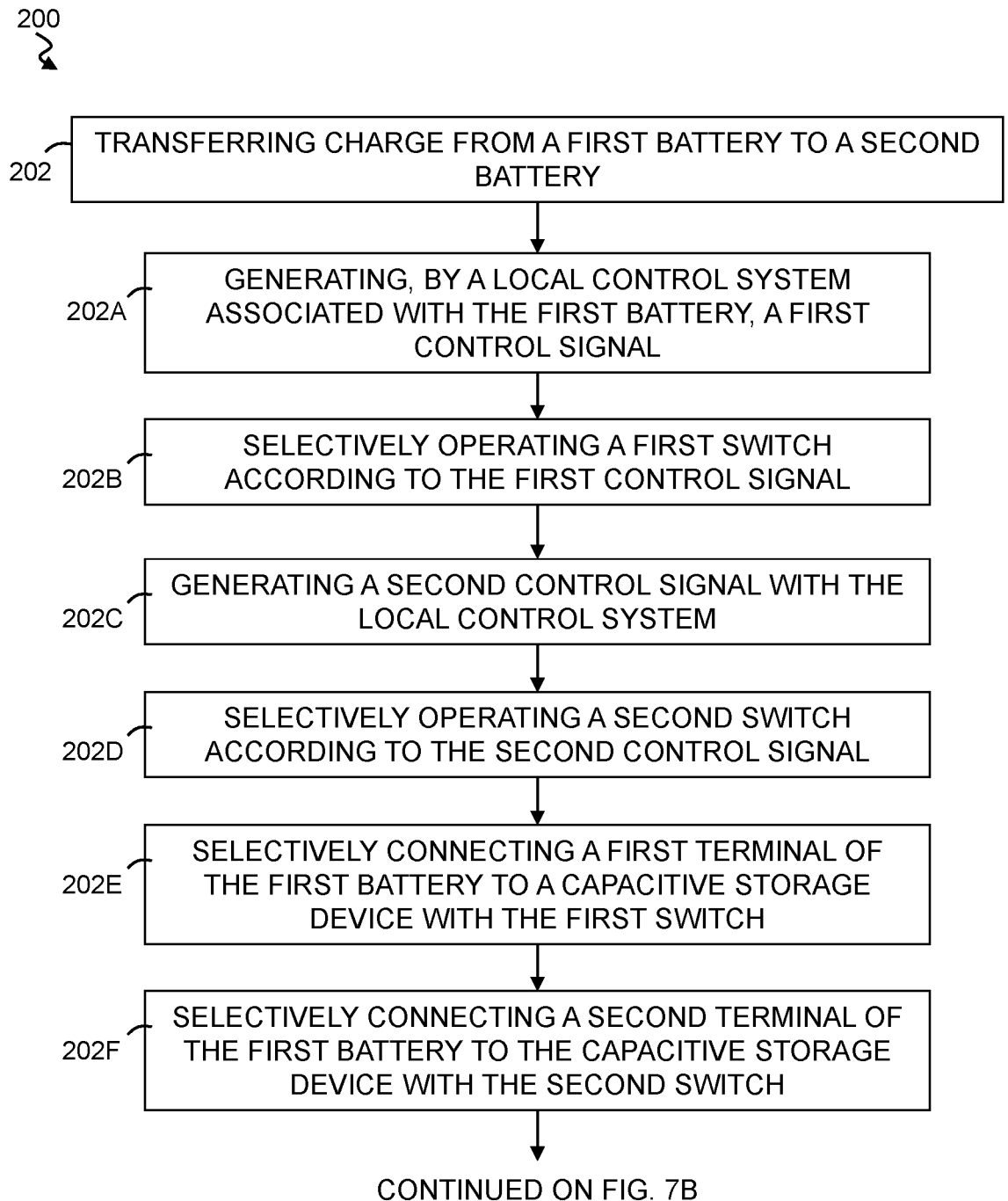
Figure 7B:
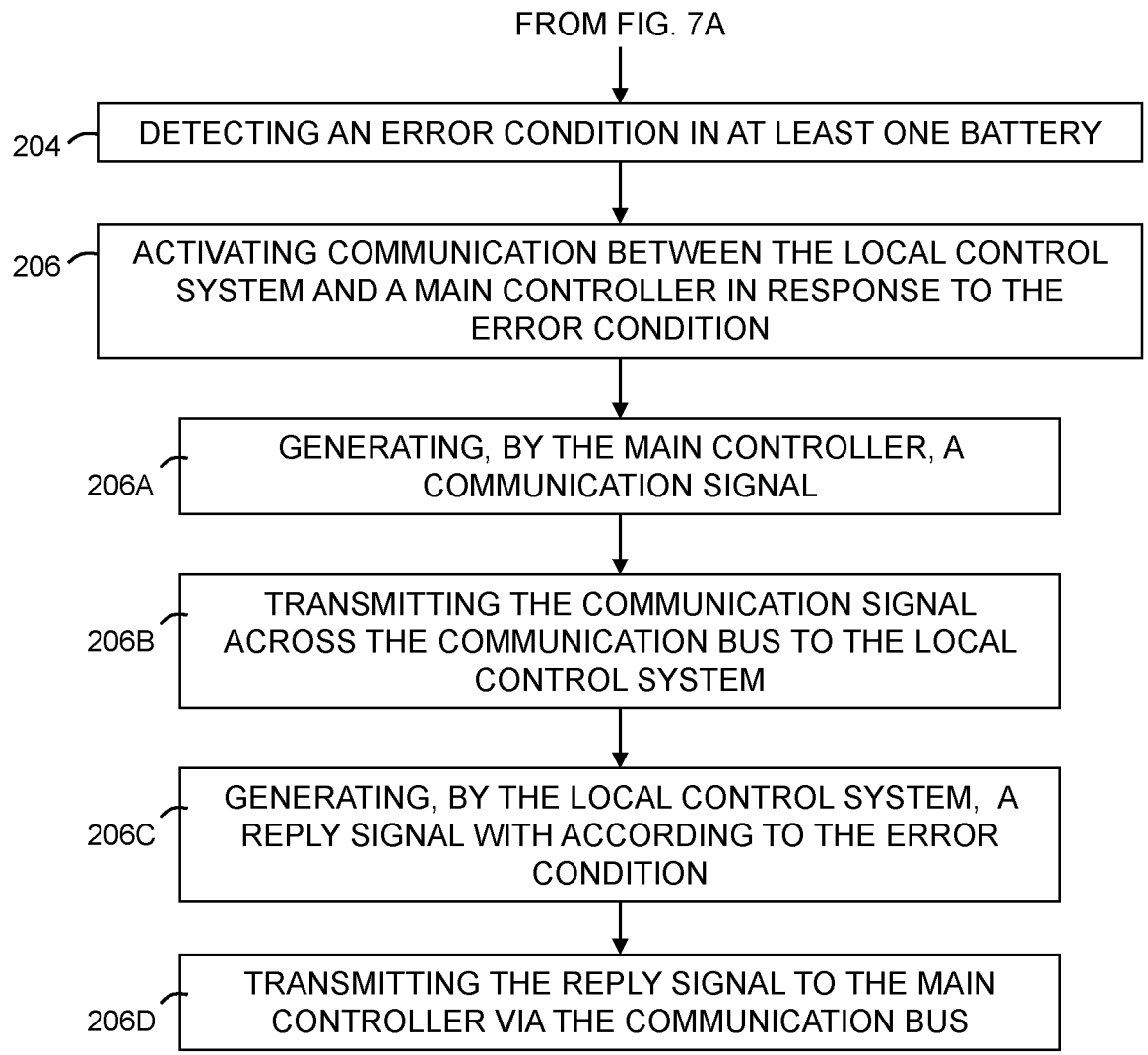

FIGS. 7A-7B illustrates a flow chart showing steps in a method for autonomous balancing and communication in a battery system having a plurality of series-connected batteries connected to a communication bus.

DETAILED DESCRIPTION OF EXEMPLARY EMBODIMENTS

The present technology may be described in terms of functional block components and various processing steps. Such functional blocks may be realized by any number of components configured to perform the specified functions and achieve the various results. For example, the present technology may employ various filters, amplifiers, transistors, resistive elements, switching devices, capacitive storage elements, microcontrollers, logic circuits, and the like, which may carry out a variety of functions. In addition, the present technology may be practiced in conjunction with any number of systems, such as automotive, aviation, battery-powered equipment (e.g., lawn mowers, power tools, e-bikes), energy storage systems for solar and wind power, electric charging stations, and any other system that utilizes battery stacking to increase the voltage of the system.

Methods and apparatus for autonomous balancing and communication in a battery system according to various aspects of the present technology may operate in conjunction with any suitable battery-powered device. For example, and referring to FIGS. 1 and 2, an exemplary battery system 100 may comprise a battery pack 105, a management network 110, a communication bus 115, and a main controller 120 (i.e., a first controller) that operate together to perform active capacitive balancing, enable monitoring of the battery pack 105, and provide communication between the management network 110 and the main controller 120. According to an exemplary embodiment, the system 100 may operate in an autonomous balancing mode and a communication mode.

The battery pack 105 may be configured to generate a desired output voltage Vpack. For example, the battery pack 105 may comprise a plurality of series-connected batteries 135, such as batteries 135(1), 135(2), and 135(N). The number of batteries 135 in the battery pack 105 may be selected according to a desired output voltage, a desired application, and the like. The battery 135 may comprise a rechargeable battery, such as a lithium-ion, lead-acid, nickel-cadmium, nickel-metal hydride or any other suitable battery type.

The management network 110 may be configured to monitor various conditions of the battery pack 105 and/or the individual batteries 135. For example, the management network 110 may be configured to monitor a voltage, a current, and a temperature of each battery 135 individually and/or a voltage, a current, and a temperature of the overall battery pack 105.

The management network 110 may operate in conjunction with the communication bus 115 to perform balancing. For example, the management network 110 may be configured to operate in conjunction with the communication bus 115 to transfer charge from one battery 135 to one or more different batteries 135 in the battery pack 105. According to an exemplary embodiment, the management network 110 and the communication bus 115 together perform active capacitive balancing.

According to an exemplary embodiment, the management network 110 comprises a plurality of management cells 125, such as management cells 125(1), 125(2) and 125(N). In various embodiments, communication and balancing may occur between all batteries 135 in the battery pack 105 or between a sub-group of batteries 135. In one embodiment, there is one management cell 125 to one battery 135. For example, if the battery pack 105 comprises 10 series-connected batteries 135, then the management network 110 comprises 10 management cells 125. In an alternative embodiment, there is one management cell 125 to a group of batteries 135. For example, each management cell 125 may be in communication with two or more batteries 135.

According to an exemplary embodiment, each management cell 125 may be configured to monitor various conditions of a respective battery 135, such as over-voltage, under-voltage, temperature, and the like. In addition, the plurality of management cells 125(1):125(N) may operate together to perform autonomous balancing of each battery 135. For example, and referring to FIG. 2, each management cell 125 may comprise a first switch element SH, a second switch element SL, and a respective local control system 140.

According to an exemplary embodiment, each management cell 125 may be connected to a positive terminal of the respective battery 135 and a negative terminal of the respective battery 135 to monitor a voltage of the respective battery 135. In addition, each management cell 125 may be connected to the communication bus 115.

Each management cell 125 may be controlled to selectively connect the respective battery 135 to the communication bus 115. For example, each management cell 125 may utilize the first switch element SH and the second switch element SL to selectively connect the battery 135 to the communication bus 115. According to an exemplary embodiment, each management cell 125 may be connected to the communication bus 115 via a respective node SWT. For example, a first management cell 125(1) may be connected to the communication bus 115 via a first node SWT(1), a second management cell 125(2) may be connected to the communication bus 115 via a second node SWT(2), and a last management cell 125(N) may be connected to the communication bus via a last node SWT(N).

According to an exemplary embodiment, the first switch element SH is connected between the positive terminal of the battery 135 and the communication bus 115 and is responsive to a first control signal $V_T$. The second switch element SL is connected between the negative terminal of the battery 135 and the communication bus 115 and is responsive to a second control signal $V_B$. Accordingly, the first switch element SH selectively connects/disconnects the positive terminal of the battery 135 to the communication bus 115 based on a value the first control signal $V_T$ and the second switch element SL selectively connects/disconnects the negative terminal of the battery 135 to the communication bus 115 based on a value the second control signal $V_B$. The first switch element SH and the second switch element SL may be connected to each other and to the communication bus 115 at the node SWT.

In an exemplary embodiment, the first switch element SH has a low resistance (e.g., 25 mOhm) and the second switch element SL has a low resistance (e.g., 20 mOhm). The first and second switch elements SH, SL may comprise transistors configured with a desired resistance.

According to an exemplary embodiment, the local control system 140 may be configured to coordinate autonomous balancing among the batteries 135(1):135(N), monitor the respective battery 135, and communicate with the main controller 120. The local control system 140 may be directly connected to the first switch element SH, the second switch element SL, and the respective battery 135. In addition, the local control system 140 may be connected to the communication bus 115 at the node SWT.

According to an exemplary embodiment, the local control system 140 may be configured to measure the voltage, the current, and the temperature, and generate an error signal in a case of any undesired operating condition, such as under-voltage, over-voltage, over-current (excessive current), under-current, short-circuit, under-temperature, over-temperature (excessive temperature), under-temperature, open-wire, and the like. The terms under-voltage, over-voltage, over-current, under-current, over-temperature, and under-temperature may be associated with predetermined values and the values may be based on the particular application, the total number of batteries, predetermined maintenance thresholds, and/or other predetermined safety thresholds.

The local control system 140 may be further configured to communicate with the main controller 120 to enable or otherwise provide error signaling. For example, the local control system may transmit the error signal to the main controller 120, wherein the main controller 120 responds to the local control system 140.

According to an exemplary embodiment, local control system 140 may comprise, a transceiver circuit 210 and a local controller 205 (i.e., a second controller), such as an FPGA, a microcontroller, a state machine in an integrated circuit, and the like.

The local controller 205 may be individually-addressed and operate according to a serial communication protocol, such as a Local Interconnect Network (LIN) protocol, a Single Edge Position Modulation (SEPM) technique, 1-Wire protocol, a Controller Area Network (CAN) protocol, and the like. According to various embodiments, the local controller 205 may comprise any addressable device and/or system suitable for operating according to a serial communication protocol, such as a microcontroller, an FPGA, an FSM device, and the like.

In addition, the local controller 205 may be configured to measure various characteristics of the respective battery 135, such as a voltage, a current, and a temperature. For example, the local controller 205 may be directly connected to the positive and negative terminals of the respective battery 135 and may be equipped with at least one of a voltage sensor, a current sensor, and temperature sensor.

The local controller 205 may be further configured to generate various signals, such as an error signal, a mode signal, control signals, and the like. For example, each local controller 205 may be configured to generate the first and second control signals $V_T$, $V_B$ according to measured battery characteristics (e.g., voltage, current, temperature) and operate the first and second switch elements SH, SL, respectively. According to an exemplary embodiment, the first and second control signals are non-overlapping signals, for example, as illustrated in FIGS. 3A-3B. In addition, a dead time may exist between the first and second control signals $V_T$, $V_B$. The dead time may be defined as a period of time, such as 10 microseconds, when the first and second signals are low (e.g., zero volts).

Each local controller 205 may comprise any circuit or system suitable for individual addressing, performing various measurements, computations, generating signals, and the like. Since the local controller 205 may be individually-addressed, each management cell 125 may be referred to as individually-addressed by way of the respective local controller 205.

According to various embodiments, each local controller 205 may operate in synchronization with the other controllers 205 according to a local clock signal (not shown) having a frequency that is approximately the same as the other local controllers 205 to ensure that all local controllers 205 in the management network 105 count time in the same way. For example, the battery system 100 may be equipped with a synchronization scheme, such as beacon synchronization, or any other suitable synchronization function.

The transceiver 210 may operate in conjunction with at least one of the first switch element SH and the second switch element SL to achieve autonomous balancing and communication. For example, the transceiver 210 may be connected between the communication bus 115 and the local controller 205. For example, the transceiver 210 may be connected to the communication bus at the node SWT. The transceiver 210 may be configured to receive data from the main controller 120 and/or transmit data to the main controller 120. For example, the transceiver 210 may comprise a pair of communication devices, such as a transmitter 225 and a receiver 230, configured for bi-directional communication. According to an exemplary embodiment, both the transmitter 225 and the receiver 230 are utilized during the autonomous balancing mode and communication mode. During communication mode, only the high side of the transmitter 225 may be used.

The communication bus 115 may be utilized for both balancing (i.e., charge equalization) and communication. For example, the communication bus 115 may comprise one or more wires and may be configured to connect the main controller 120 to each management cell 125 from the management network 110.

In addition, the communication bus 115 may comprise a plurality of series-connected capacitors, such as capacitors 130(1):130(N−1), that may be used for both autonomous balancing and communication. During the balancing mode, the capacitors 130(1):130(N−1) may operate in conjunction with the first and second switch elements SH, SL to transfer charge from a higher-voltage battery to a lower-voltage battery. During the communication mode, the capacitors 130(1):130(N−1) act as part of the physical communication bus 115.

According to an exemplary embodiment, the management cells 125(1):125(N) are connected to the communication bus 115 such that any one management cell 125 can communication with any of the other management cells 125. Alternatively, the management cells 125 may be connected to the communication bus 115 such that any one management cell 125 can only communicate with the management cells 125 that are directly adjacent to it.

The main controller 120 may be configured to communicate with and control the operation of each management cell 125. For example, the main controller 120 may operate the management cells 125 in one of the balancing mode or the communication mode. In addition, the main controller 120 may be configured to send and/or receive signals to/from each management cell 125. Since each local controller 140 is individually-addressed, the main controller 120 can send a communication signal to one particular management cell 125 and/or local controller 140, and in turn, receive a reply signal from one particular management cell 125 and/or local controller 140. For example, the main controller 120 may 'receive' signals from the management cells 125 by monitoring a line voltage level of the communication bus 115. In addition, the main controller 120 may receive an error signal generated by a single local controller 140.

According to an exemplary embodiment, the system 100 may be configured as a half-duplex communication system, wherein the main controller 120 and the local controllers 140 can communicate with each other. The main controller 120 may comprise any circuit and/or system suitable for controlling multiple devices, generating signals, receiving signals, such as a microcontroller, an FPGA, and the like.

In one embodiment, the system 100 may be equipped with a Local Interconnect Network (LIN) protocol, wherein the main controller 120 operates as a 'master', each local controller 140 operates as a 'slave', and the main controller 120 and the local controllers 140 communicate with each other via the communication bus 115. Alternatively, the main controller 120 and each local controller 140 may communicate with each other using a Single Edge Position Modulation (SEPM) technique. Alternatively, the system 100 may be equipped with a 1-Wire protocol or a CAN protocol.

In operation, and referring to FIGS. 1-6, the system 100 may be configured to operate in the autonomous balancing mode and/or the communication mode. According to an exemplary operation, each management cell 125 operates independently from the other management cells 125. In other words, each management cell 125 is responsible for generating a set of various control signals for its own control. Each management cell 125, however, may communicate with the other management cells 125, and each management cell 125 may make decisions based on the information it receives from the other management cells 125.

According to an exemplary operation, the system 100 utilizes the communication bus 115 during the communication mode and the autonomous balancing mode. For example, the main controller 120 and each individual management cell 125 may utilize the communication bus 115 to communicate with each other. In addition, the management cells 125 may utilize the communication bus 115 to transfer charge from one management cell 125 to one or more different management cells 125. For example, during one balancing cycle, one management cell 125 may transfer charge to a directly-adjacent management cell 125. Over several balancing cycles, however, the charge will be gradually transferred from the 'stronger' batteries 135 to the 'weaker' batteries 135, where charge equilibrium across all batteries 135 is desired.

During the balancing mode, and referring to FIGS. 3A-3C, during a normal balancing operation (free of errors), each management cell 125 generates non-overlapping signals separated by a dead-time, such as the first control signal $V_T$ and the second control signal $V_B$, to achieve autonomous balancing. The first switch element SH of a respective management cell 125 is operated according to the first control signal $V_T$ and the second switch element SL of the same management cell 125 is operated according to the second control signal $V_B$. As the switch elements SH, SL are activated/deactivated, charge from a higher-voltage battery 135 can be transferred to a lower-voltage battery via the capacitors 130(1):130(N−1).

The receiver 230 may act as a comparator or other logic device to sense a voltage at the respective node SWT (i.e., a SWT signal). The transmitter 225 may be used to initiate the high-to-low and low-to-high transition on the node SWT. The local controller 205 may utilize the node voltage data in conjunction with a measured voltage of the battery 135 to determine whether the battery 135 needs to be charged or discharged. The local controller 205 may then operate the first and second switch elements SH, SL accordingly.

During the balancing mode, and referring to FIGS. 4 and 5A-5C, one management cell 125 may detect an error, such as under-voltage, over-voltage, over-current (excessive current), under-current, short-circuit, under-temperature, over-temperature (excessive temperature), under-temperature, open-wire, and the like, of the respective battery 135. In this case, the local controller 205 may generate the error signal in response to the error. The error signal may be generated via the first and second control signal $V_T$, $V_B$. For example, and referring to FIGS. 5A-5B, when the local controller 205 detects an error, it keeps the first switch element SH closed (ON) while keeping the second switch element SL open (OFF). This may be achieved by keeping the first control signal $V_T$ at a high voltage and the second control signal $V_B$ at a low (or zero) voltage. The voltage at the node SWT associated with the management cell 125 having an error will, in-turn, deviate from an expected voltage. For example, the voltage at the node SWT will stay HIGH longer than expected. Accordingly, this longer-duration SWT signal (referred to as a time-out) may indicate an error.

The other management cells 125 may then detect the time-out and abort the balancing operation. The battery system 100 may initiate the communication mode.

Figure 1:
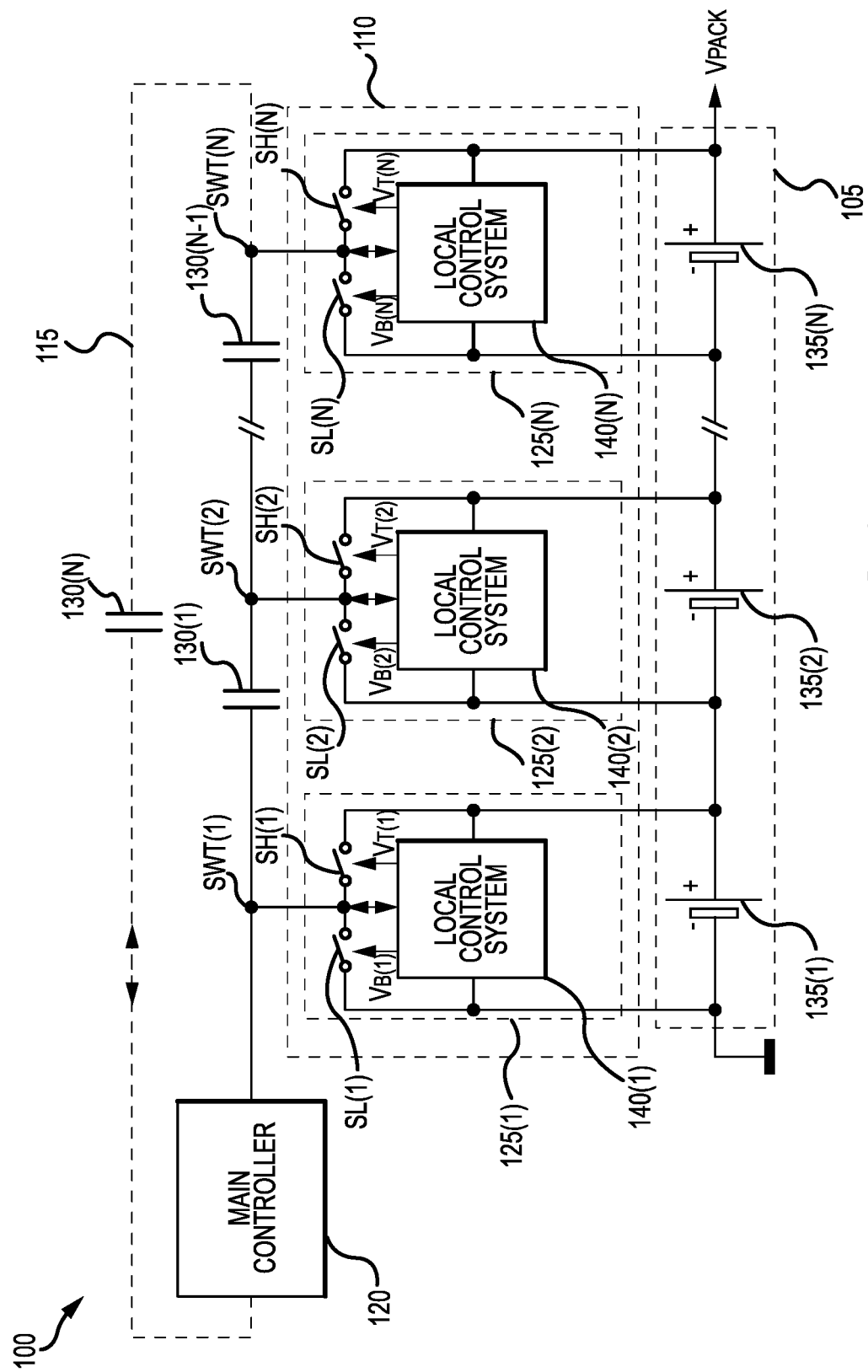
FIG. 1 is a block diagram of a battery-powered system in accordance with an exemplary embodiment of the present technology.
Figure 2:
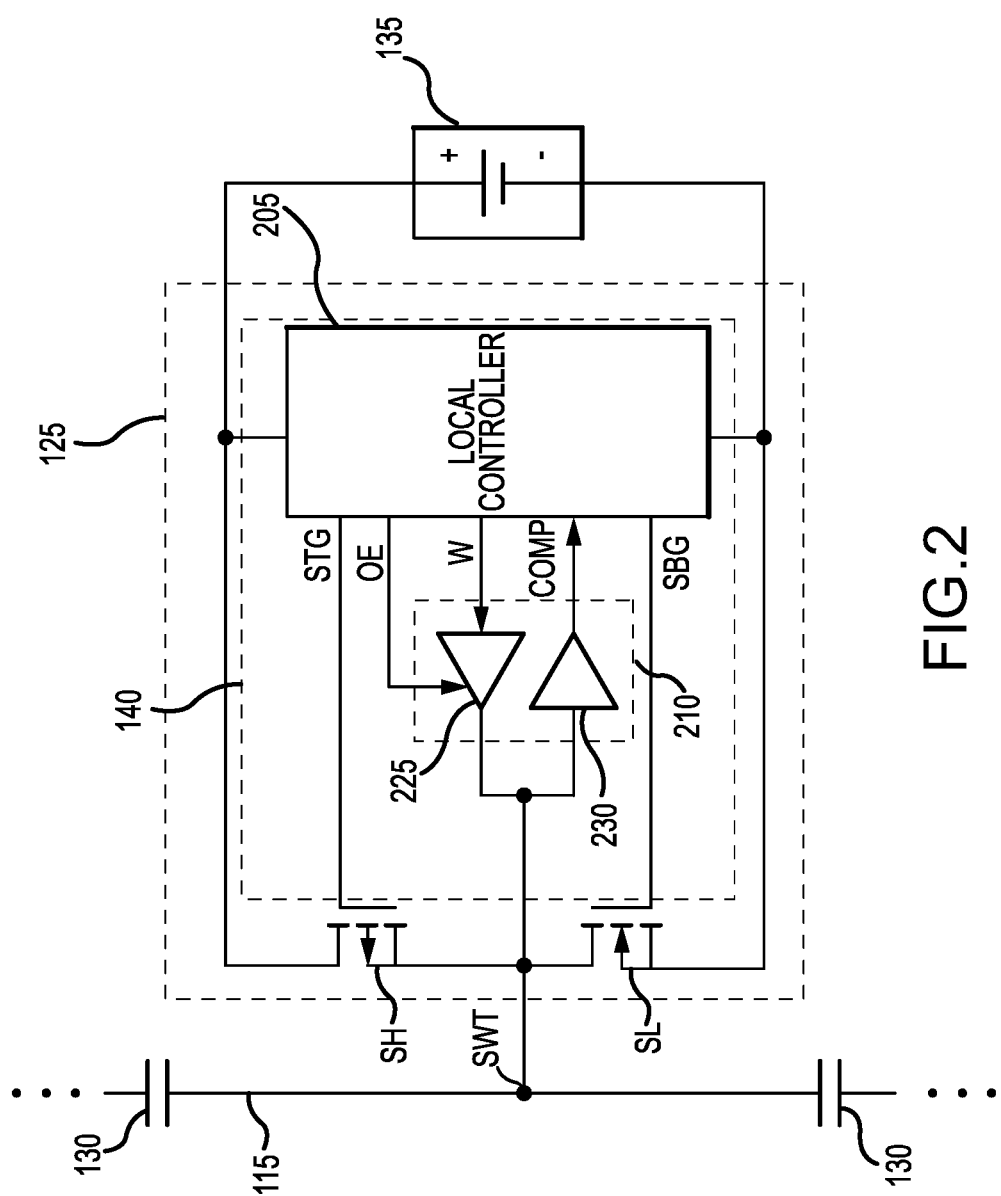
FIG. 2 is a circuit diagram of a management cell in accordance with an exemplary embodiment of the present technology.
Figure 4:
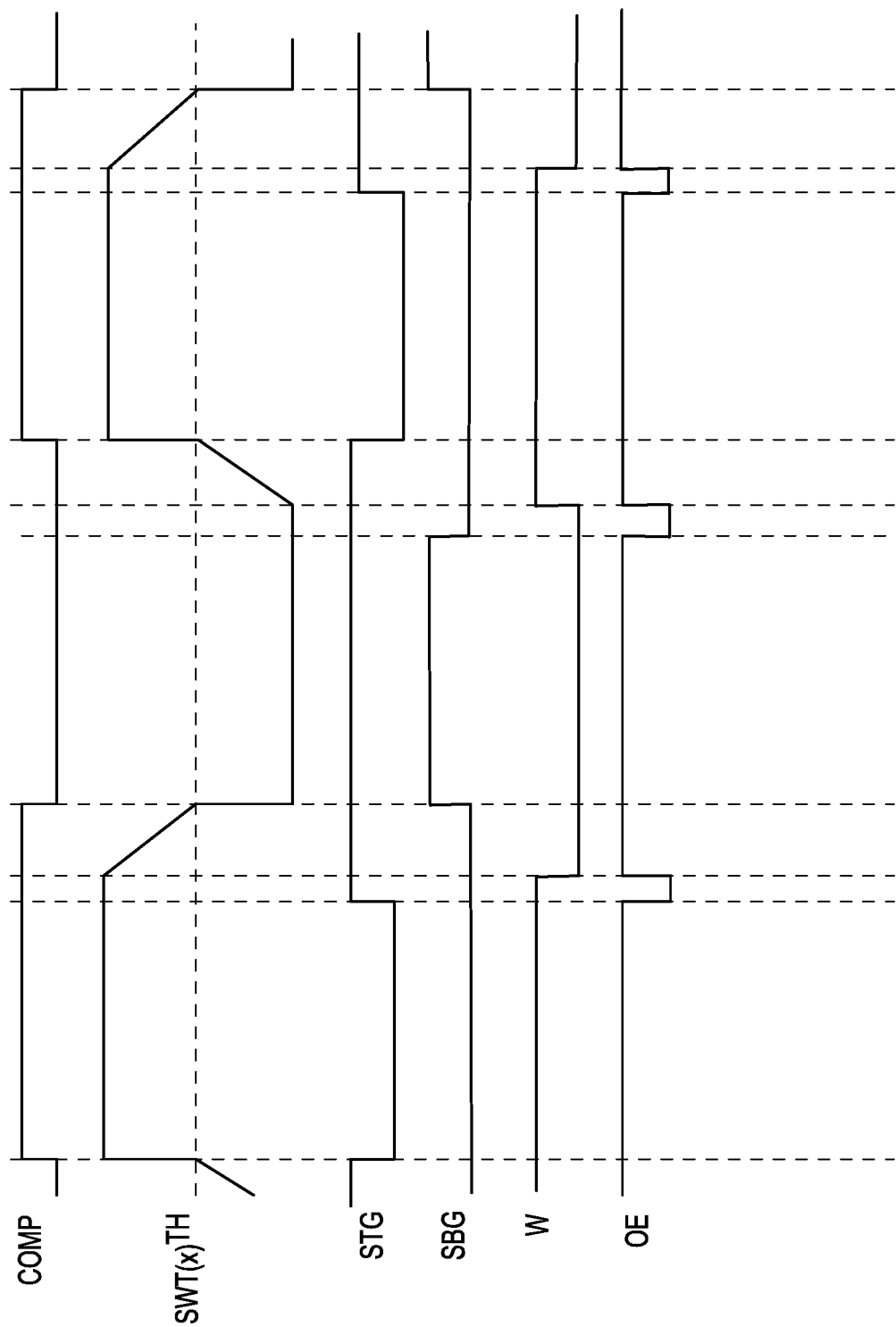
FIG. 4 is a timing diagram of a management cell during the autonomous balancing mode in accordance with an exemplary embodiment of the present technology.

In exemplary embodiment, and referring to FIGS. 1, 2, and 4, the first switch element SH may be implemented as a P-channel MOSFET, the second switch element SL may be implemented as an N-channel MOSFET, and the receiver 230 may be implemented as a comparator. During balancing, the local controller 205 may generate a first signal STG and control operation of the first switch element SH and charging/discharging of the respective battery 135. In addition, the local controller 205 may generate a second signal SBG and control operation of the second switch element SL and charging/discharging of the battery 135. In particular, the first switch element SH is OFF when the first signal STG is HIGH (and ON when and the first signal STG is LOW), and the second switch SL is ON when the second signal SBG is HIGH (and OFF when the second signal SBG is LOW). The periods when the first and second switch elements SH, SL are ON may be controlled according to a predetermined time that is counted by a timer (not shown). In addition, the ON-period for each switch SH, SL may be the same.

At the moment the first switch element SH is turned OFF, the SWT signal begins to decay from HIGH to a threshold level TH. The SWT signal decay is due to discharging of the P-channel MOSFET parasitic capacitors into a weak pull-down circuit (e.g., the transmitter 225).

The comparator 230 may continuously monitor the SWT signal by comparing it to the threshold level TH and generating a corresponding comparator signal COMP. When the SWT signal goes below the threshold level TH, comparator signal COMP goes LOW, enabling the timer to start counting again (but this time for the second switch element SL) and setting the second signal SBG to HIGH (activating the second switch element SL), therefore, pulling the SWT signal to LOW. After the timer has reached the predetermined time, the second signal SBG is set to LOW again.

Next, the SWT signal rises from LOW to the threshold value TH, and once it reaches the threshold value TH, the comparator output COMP goes HIGH again, enabling the timer to start counting again (this time for the first switch element SH) and setting the first signal STG to LOW (activating the first switch element SH), therefore, pulling the SWT signal to HIGH. The rise in the SWT signal is due to charging of the P-channel MOSFET parasitic capacitors through a weak pull-up circuit (e.g., the transmitter 225).

In the present embodiment, a delay exists between changes in the first and second signals STG, SBG to prevent short-circuit of the battery 135. The management cell 125 may perform the ON-delay-OFF sequence until all batteries 135(1):135(N) in the battery pack 105 (FIG. 1) have substantially the same voltage. As such, all batteries 135(1):135(N) in the battery pack 105 are considered "balanced" once they all have substantially the same voltage.

During the communication mode, and referring to FIGS. 1, 6A-6B, the main controller 120 may detect or otherwise sense the SWT signals (e.g., $V_{SWT(1)}$, $V_{SWT(2)}$, $V_{SWT(3)}$) on the communication bus 115 and respond accordingly. For example, the main controller 120 may generate and transmit a communication signal $V_{COMM}$ to each management cell 125 using any suitable communication protocol. The main controller 120 may be configured to communicate with a specific management cell 125 using an individual address assigned to that particular management cell 125. The specified management cell 125 may then reply to the main controller 120 may generating an appropriate reply signal and transmit the reply signal via the communication bus 115. According to an exemplary embodiment, the communication signal $V_{COMM}$ is in a recessive state when HIGH and in a dominate state when LOW. In the recessive state, all management cells 125 have both the first and second switch elements SH, SL open (OFF). In addition, and per protocol requirements, only a single management cell 125 and/or local controller 205 will generate a dominate state by closing (turning ON) the second switch element SL. The dominate state generated by one management cell 125 will be detected by the other management cells 125. The communication signal $V_{COMM}$ may toggle between dominate and recessive states in sequence until all the management cells 125 have generated a dominate state. Once communication is completed, the battery system 100 may reinitiate the balancing mode.

FIGS. 7A-7B illustrates a flow chart showing steps in a method 200 for autonomous balancing and communication in a battery system having a plurality of series-connected batteries connected to a communication bus. The method 200 includes performing autonomous balancing at step 202. Step 202 includes transferring charge from a first battery of the series-connected batteries to a second battery series-connected batteries at step 204. Step 204 includes generating, by a local control system associated with the first battery, a first control signal at sub-step 204A. Step 204 also includes selectively operating a first switch according to the first control signal at sub-step 204B. Step 204 also includes generating a second control signal with the local control system at sub-step 204C. Step 204 also includes selectively operating a second switch according to the second control signal at sub-step 204D. Step 204 also includes selectively connecting a first terminal of the first battery to a capacitive storage device with the first switch at sub-step 204E. Step 204 also includes selectively connecting a second terminal of the first battery to the capacitive storage device with the second switch at sub-step 204F. Step 202 also includes detecting an error condition in at least one battery of the series-connected batteries at step 206. Step 202 also includes activating communication between the local control system and a main controller in response to the error condition at step 206. Step 206 includes generating, by the main controller, a communication signal at sub-step 206A. Step 206 also includes transmitting the communication signal across the communication bus to the local control system at sub-step 206B. Step 206 also includes generating a reply signal with the local control system according to the error condition at sub-step 206C. Step 206 also includes transmitting the reply signal to the main controller via the communication bus at sub-step 206D.

In the foregoing description, the technology has been described with reference to specific exemplary embodiments. The particular implementations shown and described are illustrative of the technology and its best mode and are not intended to otherwise limit the scope of the present technology in any way. Indeed, for the sake of brevity, conventional manufacturing, connection, preparation, and other functional aspects of the method and system may not be described in detail. Furthermore, the connecting lines shown in the various figures are intended to represent exemplary functional relationships and/or steps between the various elements. Many alternative or additional functional relationships or physical connections may be present in a practical system.

The technology has been described with reference to specific exemplary embodiments. Various modifications and changes, however, may be made without departing from the scope of the present technology. The description and figures are to be regarded in an illustrative manner, rather than a restrictive one and all such modifications are intended to be included within the scope of the present technology. Accordingly, the scope of the technology should be determined by the generic embodiments described and their legal equivalents rather than by merely the specific examples described above. For example, the steps recited in any method or process embodiment may be executed in any order, unless otherwise expressly specified, and are not limited to the explicit order presented in the specific examples. Additionally, the components and/or elements recited in any apparatus embodiment may be assembled or otherwise operationally configured in a variety of permutations to produce substantially the same result as the present technology and are accordingly not limited to the specific configuration recited in the specific examples.

Benefits, other advantages and solutions to problems have been described above with regard to particular embodiments. Any benefit, advantage, solution to problems or any element that may cause any particular benefit, advantage or solution to occur or to become more pronounced, however, is not to be construed as a critical, required or essential feature or component.

The terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present technology, in addition to those not specifically recited, may be varied or otherwise particularly adapted to specific environments, manufacturing specifications, design parameters or other operating requirements without departing from the general principles of the same.

The present technology has been described above with reference to an exemplary embodiment. However, changes and modifications may be made to the exemplary embodiment without departing from the scope of the present technology. These and other changes or modifications are intended to be included within the scope of the present technology, as expressed in the following claims.

The invention claimed is:

1. An apparatus for a battery pack having a plurality of series-connected batteries, comprising:
    a communication bus comprising a plurality of series-connected capacitors;
    a plurality of management cells, wherein each management cell is: connected to the communication bus via a node, and directly connected to a respective battery from the battery pack and configured to perform autonomous balancing of the respective battery, wherein each management cell includes at least one switch element configured to selectively connect a terminal of the respective battery to the communication bus; and
    a first controller connected to the communication bus, wherein the first controller utilizes the communication bus to communicate with each management cell.

2. The apparatus according to claim 1, wherein each capacitor is connected between two directly-adjacent management cells from the plurality of management cells.

3. The apparatus according to claim 1, wherein each management cell is configured to:
    detect an error in the respective battery from the battery pack, wherein the error is related to at least one of:
    a temperature of the respective battery;
    a current of the respective battery; and
    a voltage of the respective battery; and
    generate an error signal according to the detected error.

4. The apparatus according to claim 1, wherein each management cell, from the plurality of management cells, comprises:
    a second controller configured to:
    generate a first control signal;
    generate a second control signal; and
    communicate with the first controller.

5. The apparatus of according to claim 4, wherein the first and second controller communicate using at least one of: a Local Interconnect Network protocol, a Single Edge Position Modulation technique, a Controller Area Network protocol, and 1-Wire protocol.

6. The apparatus according to claim 4, wherein each management cell, from the plurality of management cells, comprises a transceiver connected between the node and the second controller.

7. The apparatus according to claim 6, wherein each management cell further comprises:
    the at least one switch element including a first switch element configured to selectively connect a first terminal of the respective battery to the communication bus; and
    the at least one switch element including a second switch element configured to selectively connect a second terminal of the respective battery to the communication bus.

8. The apparatus according to claim 7, wherein:
    the first switch element is responsive to the first control signal;

the second switch element is responsive to the second control signal; and the first and second control signals are non-overlapping signals.

9. The apparatus according to claim 7, wherein:
the first switch element comprises a P-channel transistor;
the second switch element comprises an N-channel transistor.

10. A method for autonomous balancing and communication in a battery system having a plurality of series-connected batteries connected to a communication bus, comprising:
performing autonomous balancing comprising:
transferring charge from a first battery, from the plurality of batteries, to a second battery, from the plurality of batteries, comprising:
generating a first control signal with a local control system associated with the first battery;
selectively operating a first switch according to the first control signal;
generating a second control signal with the local control system;
selectively operating a second switch according to the second control signal;
selectively connecting a first terminal of the first battery to a capacitive storage device with the first switch; and
selectively connecting a second terminal of the first battery to the capacitive storage device with the second switch;
detecting an error condition in at least one battery from the plurality of batteries; and
activating communication between the local control system and a main controller in response to the error condition, wherein the communication comprises:
generating, with the main controller, a communication signal;
transmitting the communication signal across the communication bus to the local control system; and
generating a reply signal with the local control system according to the error condition; and
transmitting the reply signal to the main controller via the communication bus,
wherein the communication bus comprises a plurality of series-connected capacitors including the capacitive storage device.

11. The method according to claim 10, wherein activating the communication comprises utilizing at least one of: a Local Interconnect Network protocol, a Single Edge Position Modulation technique, a Controller Area Network protocol, and 1-Wire protocol.

12. The method according to claim 10, wherein generating the first and second control signals comprises counting with a timer for a predetermined period of time.

13. The method according to claim 10, wherein the error condition relates to at least one of: a temperature, a current, and a voltage.

14. The method according to claim 13, wherein generating the first control signal comprises comparing a node voltage of the local control system to a threshold voltage; and generating the second control signal comprises comparing the node voltage to the threshold voltage.

15. A system, comprising:
a battery pack comprising a plurality of series-connected batteries; and
an autonomous balancing and communication circuit connected to the battery pack and comprising: a first controller, a communication bus comprising a plurality of series-connected capacitors, and a management network; wherein:
the management network and the communication bus operate together to perform autonomous voltage balancing for each battery from the battery pack;
the first controller and the management network utilize the communication bus to communicate with each other and monitor each battery from the battery pack for an error condition; wherein the error relates to at least one of: a temperature, and a current;
wherein the management network comprises a plurality of management cells connected together via the communication bus, wherein each management cell is connected to: the communication bus via a node, and a positive terminal and a negative terminal of a respective battery from the battery pack; and
wherein each management cell from the plurality of management cells comprises: a first switch element connected to the node and configured to selectively connect the positive terminal to the communication bus, and a second switch element connected to the node and configured to selectively connect the negative terminal to the communication bus.

16. The system according to claim 15, wherein the first controller is connected to the communication bus and configured to communicate with each battery from the battery pack via at least one of: a Local Interconnect Network protocol and a Single Edge Position Modulation technique.

17. The system according to claim 15, wherein each management cell from the plurality of management cells comprises a second controller configured to:
selectively operate the first switch element according to a first control signal;
selectively operate the second switch element according to a second control signal;
communicate with the first controller.

18. The system according to claim 17, wherein each management cell further comprises a comparator connected to the node and configured to:
compare a voltage at the node to a threshold voltage;
generate a comparator signal based on the comparison; and
transmit the comparator signal to the second controller.

* * * * *